US009779242B2

United States Patent
Henry

(10) Patent No.: US 9,779,242 B2
(45) Date of Patent: *Oct. 3, 2017

(54) PROGRAMMABLE SECURE BIOS MECHANISM IN A TRUSTED COMPUTING SYSTEM

(71) Applicant: VIA TECHNOLOGIES, INC., New Taipei (TW)

(72) Inventor: G. Glenn Henry, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,586

(22) Filed: Oct. 31, 2016

(65) Prior Publication Data

US 2017/0046514 A1    Feb. 16, 2017

Related U.S. Application Data

(63) Continuation-in-part of application No. 14/079,087, filed on Nov. 13, 2013, now Pat. No. 9,507,942.

(51) Int. Cl.
*G06F 21/57* (2013.01)
*H04L 9/06* (2006.01)

(52) U.S. Cl.
CPC .......... *G06F 21/572* (2013.01); *H04L 9/0631* (2013.01); *H04L 9/0643* (2013.01); *G06F 2221/2139* (2013.01)

(58) Field of Classification Search
CPC .......... G06F 21/86; G06F 21/10; G06F 21/72; G06F 2221/2107; G06F 2221/2143

See application file for complete search history.

(56) References Cited

U.S. PATENT DOCUMENTS

| 5,022,077 A | 6/1991 | Bealkowski et al. |
| 5,311,581 A | 5/1994 | Merriam et al. |

(Continued)

FOREIGN PATENT DOCUMENTS

| EP | 1962221 A1 | 8/2008 |
| WO | WO03005172 A2 | 1/2003 |
| WO | WO2013032495 A1 | 3/2013 |

*Primary Examiner* — Farid Homayounmehr
*Assistant Examiner* — Sanchit Sarker
(74) *Attorney, Agent, or Firm* — McClure, Qualey & Rodack, LLP

(57) ABSTRACT

An apparatus is provided for protecting a basic input/output system (BIOS) in a computing system. The apparatus includes a BIOS read only memory (ROM), a tamper detector, a random number generator, and a JTAG control chain. The BIOS ROM includes BIOS contents stored as plaintext, and an encrypted message digest, where the encrypted message digest has an encrypted version of a first message digest that corresponds to the BIOS contents. The tamper detector is operatively coupled to the BIOS ROM, and is configured to generate a BIOS check interrupt at a combination of prescribed intervals and event occurrences, and is configured to access the BIOS contents and the encrypted message digest upon assertion of the BIOS check interrupt, and is configured to direct a microprocessor to generate a second message digest corresponding to the BIOS contents and a decrypted message digest corresponding to the encrypted message digest, and is configured to compare the second message digest with the decrypted message digest, and is configured to preclude the operation of the microprocessor if the second message digest and the decrypted message digest are not equal. The random number generator disposed within the microprocessor, and generates a random number at completion of a current BIOS check, which is employed to set a following prescribed interval, whereby the prescribed intervals are randomly varied. The (Continued)

JTAG control chain is configured to program the combination of prescribed intervals and event occurrences within tamper detection microcode storage.

21 Claims, 7 Drawing Sheets

(56) References Cited

U.S. PATENT DOCUMENTS

| | | |
|---|---|---|
| 5,666,411 A | 9/1997 | McCarty |
| 5,706,407 A | 1/1998 | Nakamura et al. |
| 5,802,592 A | 9/1998 | Chess et al. |
| 5,835,594 A | 11/1998 | Albrecht et al. |
| 5,844,986 A | 12/1998 | Davis |
| 5,883,956 A | 3/1999 | Le et al. |
| 6,009,524 A | 12/1999 | Olarig et al. |
| 6,081,664 A | 6/2000 | Nowlin, Jr. |
| 6,097,366 A * | 8/2000 | Kerigan ............... G09G 5/06 345/600 |
| 6,249,872 B1 | 6/2001 | Wildgrube et al. |
| 6,389,537 B1 | 5/2002 | Davis et al. |
| 6,401,208 B2 | 6/2002 | Davis et al. |
| 6,510,521 B1 | 1/2003 | Albrecht et al. |
| 6,587,966 B1 * | 7/2003 | Chaiken ............ G06F 11/0757 713/2 |
| 6,625,729 B1 | 9/2003 | Angelo et al. |
| 6,625,730 B1 | 9/2003 | Angelo et al. |
| 6,633,981 B1 * | 10/2003 | Davis ................... G06F 21/57 713/155 |
| 6,687,721 B1 * | 2/2004 | Wells .................... G06F 7/582 708/250 |
| 6,711,675 B1 * | 3/2004 | Spiegel ............... G06F 9/4401 713/164 |
| 6,735,696 B1 | 5/2004 | Hannah |
| 6,769,059 B1 | 7/2004 | Qureshi et al. |
| 7,108,605 B2 * | 9/2006 | LeMay ................ G07F 17/32 463/22 |
| 7,188,278 B1 | 3/2007 | Diaz et al. |
| 7,240,201 B2 | 7/2007 | Neufeld et al. |
| 7,281,125 B2 * | 10/2007 | Challener ............ G06F 21/572 380/259 |
| 7,292,596 B1 | 11/2007 | Campana et al. |
| 7,337,309 B2 | 2/2008 | Nguyen et al. |
| 7,376,968 B2 | 5/2008 | Ritz et al. |
| 7,484,105 B2 | 1/2009 | Goodman et al. |
| 7,757,098 B2 | 7/2010 | Brannock et al. |
| 7,984,283 B2 | 7/2011 | Peacock et al. |
| 8,019,994 B2 | 9/2011 | Rios et al. |
| 8,122,258 B2 * | 2/2012 | Peacock ............... G06F 9/4401 455/408 |
| 8,281,229 B2 | 10/2012 | Chew et al. |
| 8,335,930 B2 | 12/2012 | Johnson et al. |
| 8,370,641 B2 | 2/2013 | Henry et al. |
| 8,533,442 B2 | 9/2013 | Muir |
| 8,645,748 B1 | 2/2014 | Chepel et al. |
| 8,874,892 B1 | 10/2014 | Chan et al. |
| 8,894,485 B2 | 11/2014 | Caldas et al. |
| 2002/0004905 A1 * | 1/2002 | Davis ................... G06F 9/4401 713/193 |
| 2003/0018892 A1 | 1/2003 | Tello |
| 2003/0120922 A1 * | 6/2003 | Sun ..................... G06F 21/575 713/168 |
| 2004/0010686 A1 | 1/2004 | Goh et al. |
| 2005/0125652 A1 | 6/2005 | Singer et al. |
| 2005/0195975 A1 | 9/2005 | Kawakita |
| 2006/0156008 A1 * | 7/2006 | Frank ..................... G06F 21/57 713/176 |
| 2006/0174055 A1 | 8/2006 | Flynn |
| 2006/0233104 A1 | 10/2006 | Asukai et al. |
| 2007/0130452 A1 | 6/2007 | Muir |
| 2007/0235517 A1 | 10/2007 | O'Connor et al. |
| 2008/0040601 A1 * | 2/2008 | McDade, Sr. ........ G06F 21/575 713/100 |
| 2008/0072042 A1 * | 3/2008 | Okuyama .............. G06F 21/57 713/164 |
| 2008/0104381 A1 | 5/2008 | Peacock et al. |
| 2008/0104701 A1 * | 5/2008 | Peacock ............... G06F 9/4401 726/22 |
| 2008/0288766 A1 | 11/2008 | Inoue et al. |
| 2009/0006836 A1 * | 1/2009 | Takeda ..................... G06F 8/65 713/2 |
| 2009/0222653 A1 * | 9/2009 | Findeisen ............ G06F 21/72 713/2 |
| 2009/0293129 A1 | 11/2009 | Henry et al. |
| 2009/0327678 A1 * | 12/2009 | Dutton .................. G06F 21/575 713/2 |
| 2010/0042778 A1 | 2/2010 | Tanguay et al. |
| 2010/0082968 A1 | 4/2010 | Beverly |
| 2010/0122076 A1 | 5/2010 | Witty |
| 2010/0217992 A1 | 8/2010 | Hamlin et al. |
| 2011/0131400 A1 | 6/2011 | Chiu et al. |
| 2011/0160545 A1 | 6/2011 | Champadi |
| 2011/0252225 A1 | 10/2011 | Liu et al. |
| 2012/0072734 A1 | 3/2012 | Wishman et al. |
| 2012/0208619 A1 | 8/2012 | Canterbury et al. |
| 2013/0013905 A1 | 1/2013 | Held et al. |
| 2013/0061056 A1 | 3/2013 | Proudler et al. |
| 2014/0040605 A1 | 2/2014 | Futral et al. |
| 2014/0088734 A1 * | 3/2014 | Narutani ............... G05B 19/05 700/28 |
| 2014/0089651 A1 * | 3/2014 | Yao ...................... H04L 9/3247 713/2 |
| 2014/0115314 A1 | 4/2014 | Huang et al. |
| 2014/0129818 A1 | 5/2014 | Li et al. |
| 2014/0250291 A1 | 9/2014 | Adams et al. |
| 2014/0325239 A1 | 10/2014 | Ghose |
| 2014/0365755 A1 | 12/2014 | Liu et al. |
| 2015/0012738 A1 | 1/2015 | Shah et al. |
| 2015/0026132 A1 | 1/2015 | Arnaudov et al. |
| 2015/0074769 A1 | 3/2015 | Hunukumbure et al. |
| 2015/0134974 A1 | 5/2015 | Henry |
| 2015/0134975 A1 | 5/2015 | Henry |
| 2015/0134976 A1 | 5/2015 | Henry |
| 2015/0134977 A1 | 5/2015 | Henry |
| 2015/0134978 A1 | 5/2015 | Henry |

* cited by examiner

BIOS INTERFACE TO MOTHERBOARD

BIOS INTERFACE TO MICROPROCESSOR

EVENT-BASED MECHANISM FOR SECURING BIOS

US 9,779,242 B2

PROGRAMMABLE SECURE BIOS MECHANISM IN A TRUSTED COMPUTING SYSTEM

CROSS-REFERENCE TO RELATED APPLICATIONS

This application is a continuation-in-part of the following U.S. patent application:

| SERIAL NUMBER | FILING DATE | TITLE |
| --- | --- | --- |
| 14/079,087 | Nov. 13, 2013 | SECURE BIOS MECHANISM IN A TRUSTED COMPUTING SYSTEM |

This application is related to the following co-pending U.S. patent applications, each of which has a common assignee and common inventors.

| SERIAL NUMBER | FILING DATE | TITLE |
| --- | --- | --- |
| 14/079,021 | Nov. 13, 2013 | APPARATUS AND METHOD FOR SECURING BIOS IN A TRUSTED COMPUTING SYSTEM |
| 15/338,598 | Oct. 31, 2016 | JTAG-BASED SECURE BIOS MECHANISM IN A TRUSTED COMPUTING SYSTEM |
| 15/338,607 | Oct. 31, 2016 | FUSE-ENABLED SECURE BIOS MECHANISM IN A TRUSTED COMPUTING SYSTEM |
| 15/338,620 | Oct. 31, 2016 | FUSE-ENABLED SECURE BIOS MECHANISM WITH OVERRIDE FEATURE |
| 14/079,145 | Nov. 13, 2013 | EVENT-BASED APPARATUS AND METHOD FOR SECURING BIOS IN A TRUSTED COMPUTING SYSTEM DURING EXECUTION |
| 14/079,226 | Nov. 13, 2013 | PARTITION-BASED APPARATUS AND METHOD FOR SECURING BIOS IN A TRUSTED COMPUTING SYSTEM DURING EXECUTION |
| 14/079,299 | Nov. 13, 2013 | SECURE BIOS TAMPER PROTECTION MECHANISM |

BACKGROUND OF THE INVENTION

Field of the Invention

This invention relates in general to the field of microelectronics, and more particularly to an apparatus and method for securing a Basic Input/Output System (BIOS) in a computing system.

Description of the Related Art

Computing platforms come in all shapes and sizes. Desktop computers, laptop computers, tablet computers, personal digital assistants, and smart phones and just a few of the many different forms taken on by these very powerful tools.

When stripped down, virtually all of the forms of computing platforms share the same basic architecture, or configuration. At the core is a central processing unit (most often a microprocessor), memory for program storage (in the form of a hard disk or solid state disk), faster memory from which the programs are executed (typically random access memory), and memory in which a basic input/output system (BIOS) is stored.

The BIOS is the lowest level of layered programming for these platforms and enables standard operating systems and application programs to perform operations using the hardware that is specific to a given computing platform configuration. The BIOS generalizes the myriad number of particulars associated with hardware interfaces so that when changes are made to the platform configuration, higher level programs need not be modified to accommodate the changes. Rather, the BIOS is typically upgraded when changes are made, which is why its storage is typically separate from storage for the operating system and application programs.

Not only does BIOS include the basic operations of the given computing platform, but it also includes configuration data and security data (such as whether the given computing system is authorized to execute certain application programs, etc.). Because BIOS contains security data, it is typically a target for hackers and the like. By modifying a system's BIOS, for example, an unauthorized user may be able to execute programs without a license. Thus, it is extremely important to system designers that the validity and integrity of BIOS be protected and ensured, when the system is not operating and when it is operating.

So, on the one hand it is desirable to provide easy access to a system's BIOS in order to support upgrades and/or reprogramming to support system configuration changes. And on the other hand it is important to protect or restrict access to BIOS contents to preclude tampering by unauthorized parties.

Some attempts at achieving one or both of the above objectives have resulted in mechanisms that are limiting. For example, moving BIOS storage onto the same die as the system's microprocessor protects it from tampering, yet totally defeats the ease of upgrade objective because the BIOS no longer is physically accessible. Other techniques resort to encryption of BIOS contents, which is advantageous from a protection perspective, but which cripple the performance of a system because of the unacceptable number of operations that are required to decrypt BIOS contents each time it is used.

Accordingly, what is needed is a novel technique that supports accessibility and upgrade of a computing system's BIOS contents, but which also protects those contents from unauthorized tampering.

SUMMARY OF THE INVENTION

The present invention, among other applications, is directed to solving the above-noted problems and addresses other problems, disadvantages, and limitations of the prior art.

The present invention provides a superior technique for protecting a computing system from attacks on its BIOS. In one embodiment, an apparatus is provided for protecting a basic input/output system (BIOS) in a computing system. The apparatus includes a BIOS read only memory (ROM), a tamper detector, a random number generator, and a JTAG control chain. The BIOS ROM includes BIOS contents stored as plaintext, and an encrypted message digest, where the encrypted message digest has an encrypted version of a first message digest that corresponds to the BIOS contents. The tamper detector is operatively coupled to the BIOS ROM, and is configured to generate a BIOS check interrupt at a combination of prescribed intervals and event occurrences, and is configured to access the BIOS contents and the encrypted message digest upon assertion of the BIOS check interrupt, and is configured to direct a microprocessor to generate a second message digest corresponding to the BIOS contents and a decrypted message digest corresponding to the encrypted message digest, and is configured to compare the second message digest with the decrypted message digest, and is configured to preclude the operation of the microprocessor if the second message digest and the decrypted message digest are not equal. The random number generator disposed within the microprocessor, and generates a random number at completion of a current BIOS check, which is employed to set a following prescribed interval, whereby the prescribed intervals are randomly varied. The JTAG control chain is configured to program the combination of prescribed intervals and event occurrences within tamper detection microcode storage.

One aspect of the present invention contemplates an apparatus for protecting a basic input/output system (BIOS) in a computing system. The apparatus includes a BIOS read only memory (ROM) and a microprocessor. The BIOS ROM includes BIOS contents stored as plaintext, and an encrypted message digest, where the encrypted message digest has an encrypted version of a first message digest that corresponds to the BIOS contents. The microprocessor includes a tamper detector, a random number generator, and a JTAG control chain. The tamper detector is operatively coupled to the BIOS ROM, and is configured to generate a BIOS check interrupt at a combination of prescribed intervals and event occurrences, and is configured to access the BIOS contents and the encrypted message digest upon assertion of the BIOS check interrupt, and is configured to direct a microprocessor to generate a second message digest corresponding to the BIOS contents and a decrypted message digest corresponding to the encrypted message digest, and is configured to compare the second message digest with the decrypted message digest, and is configured to preclude the operation of the microprocessor if the second message digest and the decrypted message digest are not equal. The random number generator disposed within the microprocessor, and generates a random number at completion of a current BIOS check, which is employed to set a following prescribed interval, whereby the prescribed intervals are randomly varied. The JTAG control chain is configured to program the combination of prescribed intervals and event occurrences within tamper detection microcode storage.

Another aspect of the present invention envisions a method for protecting a basic input/output system (BIOS) in a computing system. The method includes storing BIOS contents as plaintext in a BIOS ROM along with an encrypted message digest that comprises an encrypted version of first message digest that corresponds to the BIOS contents; programming a combination of prescribed intervals and event occurrences in tamper detection microcode storage; generating a BIOS check interrupt that interrupts normal operation of the computing system at the combination of prescribed intervals and event occurrences; upon assertion of the BIOS check interrupt, accessing the BIOS contents and the encrypted message digest, and generating a second message digest corresponding to the BIOS contents and a decrypted message digest corresponding to the first encrypted message digest using the same algorithms and key that were employed to generate the first message digest and the encrypted message digest; comparing the second message digest with the decrypted message digest; precluding operation of the microprocessor if the second message digest and the decrypted message digest are not equal; and employing a random number generator within the microprocessor to generate a random number at completion of a current BIOS check, which is employed to set a following prescribed interval, whereby the prescribed intervals are randomly varied.

Regarding industrial applicability, the present invention is implemented within a MICROPROCESSOR which may be used in a general purpose or special purpose computing device.

BRIEF DESCRIPTION OF THE DRAWINGS

These and other objects, features, and advantages of the present invention will become better understood with regard to the following description, and accompanying drawings where.

DETAILED DESCRIPTION

Figure 1:
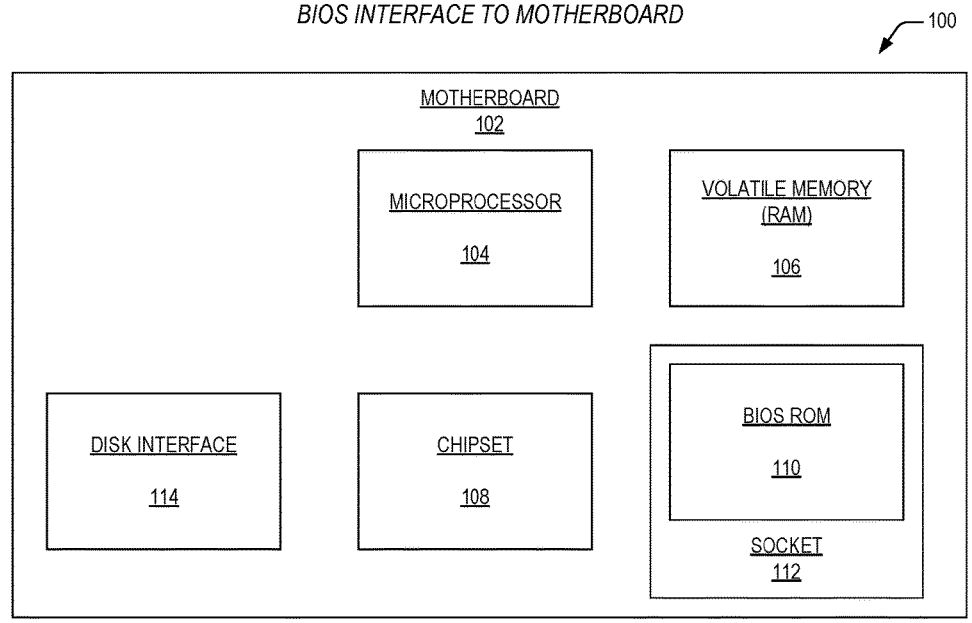
FIG. 1 is a block diagram illustrating physical components disposed on the motherboard of a present day computing system.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

DEFINITIONS

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Fuse: A conductive structure typically arranged as a filament which can be broken at select locations by applying a voltage across the filament and/or current through the filament. Fuses may be deposited at specified areas across a die topography using well known fabrication techniques to produce filaments at all potential programmable areas. A fuse structure is blown (or unblown) subsequent to fabrication to provide for desired programmability of a corresponding device disposed on the die.

Figure 2:
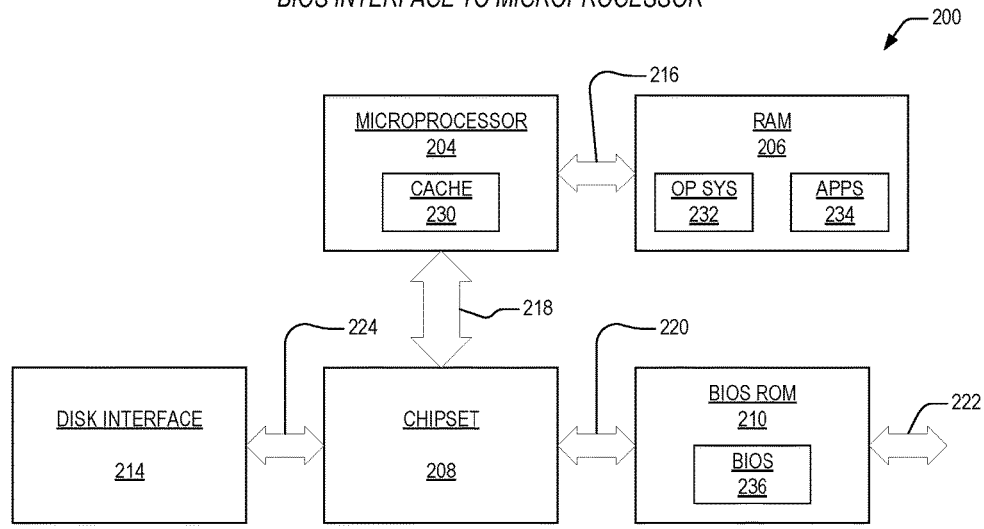
FIG. 2 is a block diagram depicting how the components of FIG. 1 are interconnected, and in particular how the present day computing system is configured with respect to its BIOS.

In view of the above background discussion on securing critical programs and data in a trusted computing system and associated techniques employed within present day systems to detect and/or preclude tampering with those programs and data, a discussion will now be presented with reference to FIGS. 1-2 of those techniques as regards the BIOS component of a present day system. Following this, a discussion of the present invention will be presented with reference to FIGS. 3-7.

Referring to FIG. 1, a block diagram 100 is presented illustrating physical components disposed on a motherboard 102 (also referred to as a system board) of a present day computing system. The components include a microprocessor 102 (also known as a CPU, processor, processor chip, etc.), a volatile memory 104 (also referred to as random access memory (RAM)), a chipset 108 (also called a memory controller, a memory hub, an input/output hub, or a bridge (e.g., Northbridge or Southbridge)), a BIOS read-only memory (ROM) 110 that is typically installed in a socket 112, and a disk interface 114. The motherboard 102 is typically installed within a computer chassis (e.g., a desktop or laptop chassis, a cell phone chassis, a tablet computer chassis, a set top box chassis), along with other components (e.g., power supply) that are required to complete a particular computer configuration. As one skilled in the art will appreciate, there are many additional components and elements (e.g., clock generator, fans, connectors, graphics processor, etc.) that are mounted on a typical present day motherboard 102, and it is noted that those additional component and elements are not shown for clarity sake. One skilled will also appreciate that there are many different variants of the components 104, 106, 114, 108, 110, 112 shown in FIG. 1 which may be disposed on a typical present day system board 102, and it is noted that those components 104, 106, 114, 108, 110, 112 shown are referred to by their generally accepted names. It is sufficient for this application to note that the microprocessor 104 is coupled to the depicted components 106, 114, 108, 110, 112 via physical interfaces (not shown) on the motherboard 102, typically metal traces. It is also noted that the socket 112 is provided on the motherboard 102 because the BIOS ROM 110 is subject to relatively frequent replacement in the factory and/or the field.

Turning now to FIG. 2, a block diagram 200 is presented depicting how the components 104, 106, 114, 108, 110, 112 of FIG. 1 are interconnected, and in particular how the present day computing system is configured with respect to its Basic Input/Output System (BIOS). The block diagram 200 shows a microprocessor 204 that includes an on-chip (i.e., on-die) high-speed cache memory 230. The microprocessor 204 is coupled to a slower random access memory 206 via a memory bus 216. The microprocessor 204 is also coupled to a chipset 208 via a system bus 218, and the chipset 208 is coupled to a disk interface 214 and a BIOS read only memory (ROM) 210 via a disk interface bus 224 and ROM bus 220, respectively. The BIOS ROM 210 may be coupled via a BIOS programming bus 222 to an optional BIOS programming interface (not shown). As one skilled in the art will appreciate, variations of the configuration shown in FIG. 2 may include a chipset 208 that also provides for interface to the RAM 206 over the system bus 218 as opposed to a direct memory bus 216, and that may also provide for other types of busses (not shown) for interfacing the microprocessor 204 to other types of peripheral interfaces (e.g., PCI Express, graphics processors).

In operation, as one skilled in the art will appreciate, application programs 234 such as MICROSOFT® WORD® are stored on a hard (or solid-state) disk (not shown), which are accessed via the disk interface 214. Because the hard disk is a relatively slow device, the application programs 234, prior to execution, are typically transferred to the external RAM 206 and then portions of these programs 234 are cached for execution by the microprocessor 204 in its internal cache memory 230. When instructions in the application programs 234 require that the microprocessor 204 perform system level operations (e.g., saving a document to disk), then instructions (e.g., a save request) from operating system software 232, which is also loaded from hard disk into the RAM 206 and cached in internal cache 230, are executed by the microprocessor 204. The operating system software 232 provides for a more general interface that enables the application programs 234 to perform system level functions without a specific knowledge of the configuration. The operating system software 232 also allows for multiple application programs 234 to execute simultaneously on the microprocessor 204, and furthermore performs background operations to efficiently manage use of the RAM memory 206.

However, operating systems 232 are in fact a middle layer of software within a present day computing system. In order to actually interface to hardware in the computing system (e.g., the hard disk), the operating system 232 must execute instructions in a BIOS 236 that is stored in the BIOS ROM 210. The BIOS 236 is typically a number of small programs that are function as the lowest level of software in a computer system, and that interface the operating system 232 to the hardware of the computer system. Like the operating system 232, the BIOS 236 provides for a generalized interface to the computer hardware that allows the operating system 232 to access the hardware without a specific knowledge thereof. The BIOS 236 enables a system designer to make changes to the hardware (e.g., the hard disk, chipset 208, RAM 206) in the computer system, without requiring that the operating system 232 or application programs 234 be modified. Yet, when such changes in configuration are introduced, the BIOS 236 must be updated, and this is why the socket 112 and/or BIOS programming bus 222 are provided on the motherboard 102. These features are provided to enable ease of replacement or reprogramming of the BIOS ROM 210. In some configurations the BIOS ROM 210 can be reprogrammed directly over the BIOS ROM bus 220. Consequently, to allow for modification of the BIOS 236, virtually all present day computing systems provide the mechanisms described above. The BIOS ROM 210 is a separate component that is easily accessible for purposes of reprogramming or replacement.

The BIOS 236 is a very important feature in all computing system configurations because the instructions therein enable the application programs 234 and operating systems 232 to directly interface with the hardware. In addition to providing for interface to system hardware, the BIOS 236 performs a number of other functions that are essential to proper operation of a system. For example, when the system is powered up, a power-on self test program within the BIOS 236 is executed to perform hardware tests and to verify proper configuration and operation of the system. The BIOS 236 also includes programs that identify and assign system resources to newly installed devices. The BIOS 236 further includes programs that load the operating system 232 from the hard disk into the RAM 206, and that transfer system control to the operating system 232. Finally, the BIOS 236 includes programs that detect and preclude tampering with the computing system.

Because the BIOS 236 is critical to both the security of and proper operation of a computing system, it is often a primary target for hacking and other forms of unauthorized tampering. For example, many well known operating systems include provisions for activation by equipment manufacturers that is based on the BIOS 236 within a given computing system, thus allowing the manufacturers to sell the given computing system with its operating system pre-installed. Typically, a marker (or "signature") is programmed into a specific location the BIOS 236 by the manufacturer, and when the operating system boots up, it reads that marker from the specific location in the BIOS 236 to confirm that it is booting on an authorized system. If the marker is absent or incorrect, then the operating system will not boot.

The above example is one of many different types of security features that are programmed into a present day BIOS 236, and the present inventors note that it is beyond the scope of the present application to provide an in depth discussion of BIOS security features. It is sufficient herein to note that the protection of a system's BIOS 236 is a paramount concern for system designers, because it is a primary target for tampering. In the example above, the objective for a hacker would be to edit (e.g., reprogram) a BIOS 236 in order to make the given computing system appear as an authorized system to a protected operating system, or to make changes to the BIOS such that the operating system determines that it is running on an authorized system, when indeed it is not.

As alluded to above, most present day BIOS ROMs 110 are separate components on a motherboard 102 and they are installed in a socket 112, specifically to allow easy replacement when system hardware changes necessitate changes to the BIOS 236. Thus, hacks like the one described would be essentially effortless in the absence of other security mechanisms.

Consequently, system designers have developed many different techniques to detect and preclude tampering with a system and with the application programs 234 and/or operating systems 232 running on the system. For example, in U.S. Patent Publication No. 2005/0015749, Mittal et al. propose protecting software from tampering by providing a secure memory partition and a microprocessor that includes cryptographic logic to encrypt and decrypt programs and data. However, since the BIOS resides in a separate memory space from system software, it cannot be protected from tampering by any means other that moving it onto the same die as the microprocessor, which thus defeats a requirement for easy updates of the BIOS through chip replacement.

In U.S. Pat. No. 7,831,839, Hatakeyama discloses a secure boot ROM that includes encrypted boot code (i.e., BIOS), and a processor that includes a hardware decryption unit. When the processor boots up, the encrypted BIOS is read into local memory in the microprocessor and the decryption unit decrypts and authenticates the BIOS. If successful, then the processor enters a secure processing mode and all BIOS calls are executed thereafter from the local, on-die memory. While Hatakeyama provides a mechanism for protecting BIOS via encryption of its contents, in order to execute efficiently, on-die local memory must be provided to store the decrypted BIOS, and as one skilled in the art will appreciate, most present day BIOS programs (including configuration data) are megabytes in size. Thus, the present inventor has observed that Hatakeyama's approach to BIOS protection is disadvantageous because providing megabytes of on-die local memory increases the size and power consumption of the microprocessor, it decreases the reliability of the part, and its overall cost goes up.

Other techniques have been developed that rely upon encrypting all or a portion of the BIOS contents, which must be decrypted each time a BIOS call is made, and the present inventor has noted that such techniques degrade the performance of a computing system, particularly during boot-up, because decryption is inherently a slow process, even when employing on-die cryptographic hardware. Thus, encrypting BIOS contents is undesirable from a performance perspective.

Accordingly, all of the above techniques—markers, secure memory partitions, on-die local BIOS memory, encrypted BIOS contents—fail to provide the ease of access to a system's BIOS ROM while at the same time minimizing performance impacts. Consequently, the present invention is provided to overcome these limitations, and others, through the employment of novel techniques that enable the use of physically distinct BIOS ROMs, which may be installed in sockets for ease of upgrade, and that provide BIOS content (e.g., instructions and/or configuration data) which is unencrypted (i.e., plaintext), yet that are capable of detecting tampering initially upon boot-up, and thereafter during system operation, without noticeably degrading system performance. The present invention will now be discussed with reference to FIGS. 3-7.

Figure 3:
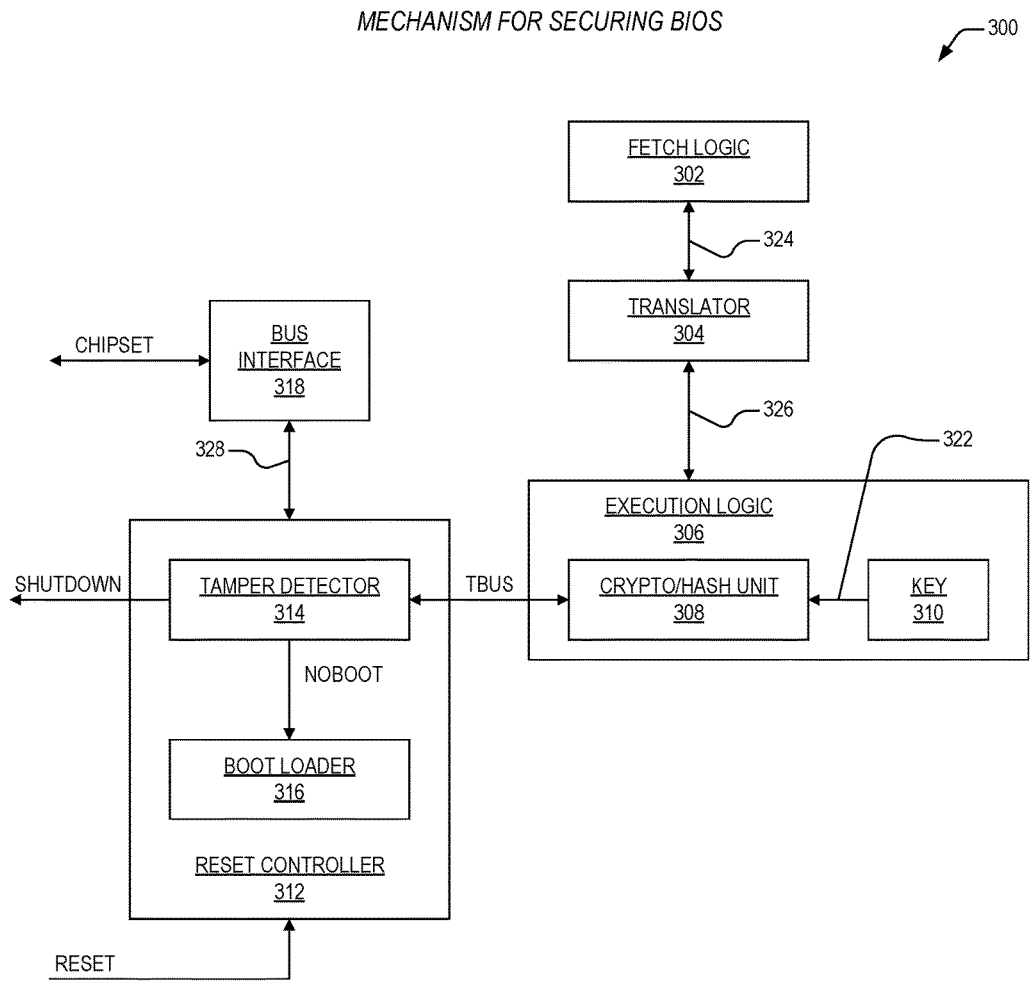
FIG. 3 is a block diagram featuring a mechanism according to the present invention for securing the BIOS of a computing system.

Turning to FIG. 3, a block diagram 300 is presented featuring a mechanism according to the present invention for securing the BIOS of a computing system. The diagram 300 illustrates elements of a microprocessor (e.g., processor, CPU, etc.) according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 302 that is coupled to a translator 304 via bus 324. The translator 304 is coupled to execution logic 306 via bus 326. The execution logic 306 includes a crypto/hash unit 308 that is coupled to key storage 310 via bus 322. The microprocessor also includes a bus interface 318 through which the microprocessor interfaces to a chipset. The bus interface 318 is coupled to a reset controller 312 via bus 328. The reset controller 312 receives a reset signal RESET and generates a shutdown signal SHUTDOWN. The reset controller 312 includes a tamper detector 314 that is coupled to a boot loader 316 via bus NOBOOT. The reset controller 312 is coupled to the execution logic 306 via a tamper bus TBUS.

In operation, the fetch logic 302 is configured to fetch program instructions (from application programs, operating systems, and BIOS cached in memory) for execution. The program instructions are provided to the translator 304 over bus 324. The program instructions are translated by the translator 304 into one or more microinstructions that are executed by one or more elements within the execution logic 306 to perform the operations specified by the program instructions. The microinstructions (also known as microcode or firmware) are unique to the microprocessor and are not accessible at the package level.

Under normal operating conditions, the BIOS instructions and configuration data are paged and cached in virtual memory after boot-up, and are therefore fetched by the fetch logic 302 for execution. However, normal operation of the microprocessor occurs following a successful reset and boot sequence. The reset controller 312 receives the reset signal RESET and directs the execution logic 306 to executed microcode to perform self-tests and to begin boot up of the system. To detect BIOS tampering and to preclude unauthorized operation of a system within which the microprocessor is disposed, the reset controller 312—prior to boot up—fetches all of the contents a BIOS ROM (not shown) via the bus interface 318, and provides the contents to the execution logic 306 via TBUS. In one embodiment, the contents of the BIOS ROM contain a digital signature (also known as a hash or message digest) stored at a specific location in the BIOS ROM. As one skilled in the art will appreciate, depending upon the specific hash algorithm that is employed, the digital signature that corresponds to a hash of the BIOS ROM (say, 4 Megabytes in size) is very small in size (e.g., 256 bits), and is unique to the specific contents of the BIOS ROM. That is, if contents of the ROM are changed, then a hash of the changed contents will result in a different digital signature.

Prior to storage in the BIOS ROM, the digital signature is encrypted using a cryptographic key that is provided to the BIOS manufacturer by the manufacturer of the microprocessor. The cryptographic key is programmed into the key storage 310 during fabrication of the microprocessor and thereafter cannot be accessed via program instructions. In one embodiment, the key is unique to the microprocessor. In one embodiment, contents of the key storage 310 are accessible exclusively by the crypto/hash unit 308 under control of tamper detection microcode. The tamper detection microcode directs the reset controller 312 to fetch the contents of the BIOS ROM, including the encrypted digital signature, and the contents are provided to the execution logic 306 via TBUS. Therein, the tamper detection microcode directs the crypto/hash unit 308 to perform a hash of the BIOS according to the hash algorithm that was used by the BIOS manufacturer to generate the digital signature. In one embodiment, the hash algorithm may be the Secure Hash Algorithm (e.g., SHA-0, SHA-1, etc.). Other embodiments contemplate use of any of numerous well known message digest algorithms. The tamper detection microcode also directs the crypto/hash unit 308 to decrypt the encrypted digital signature that was fetched from the BIOS ROM using the key stored in the key storage 310. In one embodiment the crypto/hash unit employs the Digital Encryption Standard (DES) algorithm to decrypt the key. Another embodiment contemplates use of the Advanced Encryption Standard (AES) algorithm. Other embodiments employ any of the well known cryptographic algorithms. The digital signature generated by the crypto/hash unit 308, along with the decrypted digital signature whose encrypted version is stored at the specific location in the BIOS ROM are provided to the tamper detector 314 via TBUS.

The tamper detector 314 compares the two digital signatures. If they are equal, then the tamper detector 314 directs the boot loader 316 via bus NOBOOT to begin a normal boot sequence for the microprocessor. If the two signatures are not equal, then the tamper detector 314 asserts signal SHUTDOWN and directs the boot loader 316 to discontinue the boot sequence. The SHUTDOWN signal directs remaining elements of the microprocessor to power down or otherwise enter a mode that precludes normal operation.

Advantageously, each time the microprocessor is reset, operations are performed according to the present invention that only require decryption of an encrypted message digest that is stored in the specific location in the BIOS ROM, that is, decryption of a, say, 256-bit string as opposed to a 4 Megabyte string. In addition, the present invention allows for use of plaintext BIOS instructions/data that are stored in a physically accessible configuration, such as the configuration discussed above with reference to FIGS. 1-2. Ease of BIOS update is preserved, and system performance is not degraded. Costly internal local memory for storing decrypted BIOS is not required. Furthermore, the cryptographic key that is employed to encrypt the message digest for storage in the BIOS ROM cannot be accessed by program instructions. It can only be accessed directly by the crypto/hash unit 308.

Figure 4:
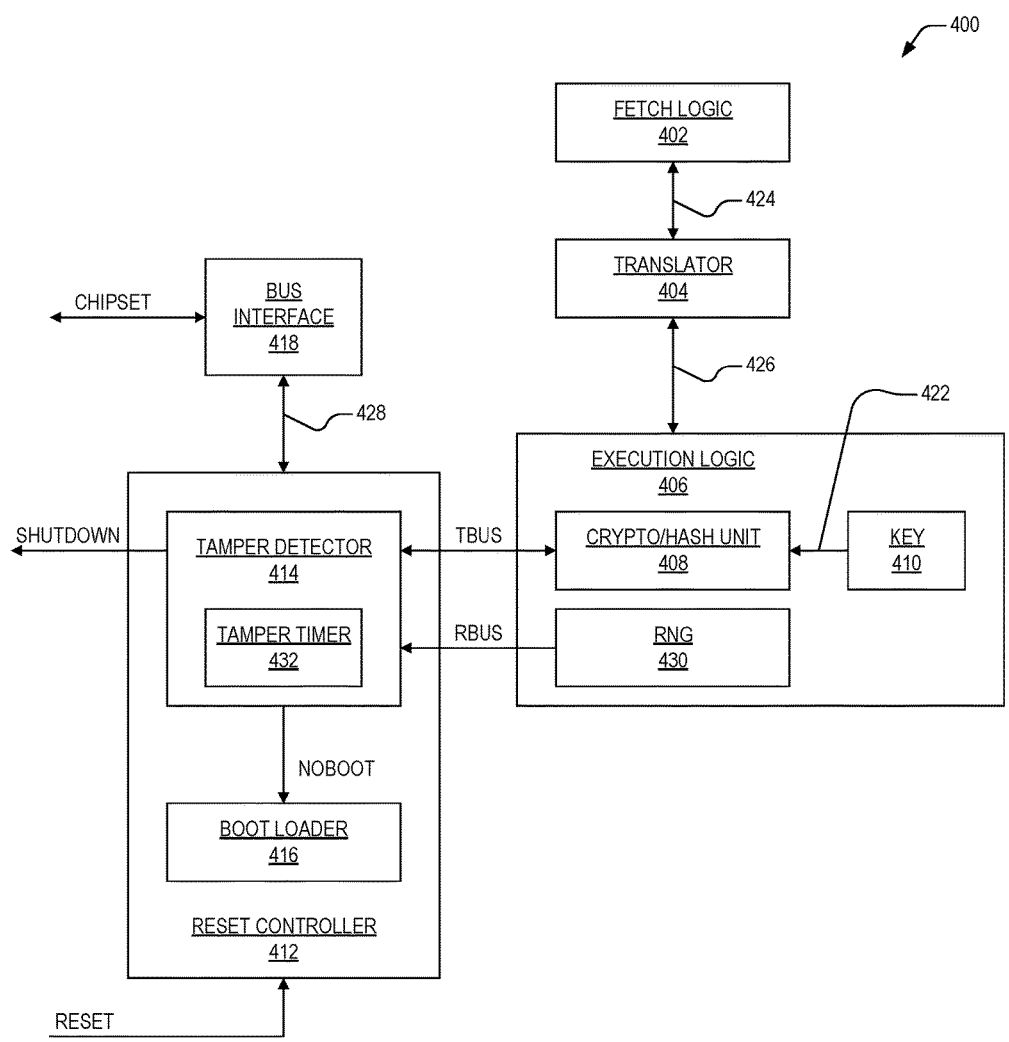
FIG. 4 is a block diagram showing a periodic mechanism according to the present invention for securing the BIOS of a computing system.

Now referring to FIG. 4, a block diagram 400 is presented showing a periodic mechanism according to the present invention for securing the BIOS of a computing system. The mechanism of FIG. 3 is employed to secure a system's BIOS upon boot up, but the present inventor has observed that it is also possible to tamper with the BIOS when the system is operating normally, and thus there is a need to secure the BIOS from hacks during operation of the system as well as upon power up. Accordingly, the periodic mechanism is provided to accomplish this objective.

The diagram 400 illustrates elements of a microprocessor according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 402 that is coupled to a translator 404 via bus 424. The translator 404 is coupled to execution logic 406 via bus 426. The execution logic 406 includes a crypto/hash unit 408 that is coupled to key storage 410 via bus 422. The execution logic 406 also includes a random number generator 430. The microprocessor also includes a bus interface 418 through which the microprocessor interfaces to a chipset. The bus interface 418 is coupled to a reset controller 412 via bus 428. The reset controller 412 receives a reset signal RESET and generates a shutdown signal SHUTDOWN. The reset controller 512 includes a tamper detector 414 that is coupled to a boot loader 416 via bus NOBOOT. The tamper detector 414 includes a tamper timer 432. The reset controller 412 is coupled to the execution logic 406 via a tamper bus TBUS and a random number bus RBUS.

In operation, elements of the mechanism of FIG. 4 perform in a manner substantially similar to those like named elements of the mechanism of FIG. 3. However, in addition to detecting BIOS tampers during a reset boot sequence, the mechanism of FIG. 4 also includes tamper detection microcode and elements that periodically check the BIOS to determine if it has been tampered with while the computing system is operating. Like the cryptographic key, the tamper timer 432 cannot be accessed by program instructions, but exclusively by the tamper detector 414 and tamper detection microcode. In one embodiment, the tamper timer 432 interrupts normal operation of the system at an interval which is established by the tamper detection microcode. In one embodiment, this interval is 1 millisecond, which is more than sufficient to detect physical attempts to replace the BIOS ROM with a hacked BIOS ROM. The 1-millisecond interval is also sufficient to detect attempts to reprogram an existing BIOS ROM. When interrupted at this interval, the controller 412 fetches all of the contents the BIOS ROM (not shown) via the bus interface 418, and provides the contents to the execution logic 406 via TBUS. The tamper detection microcode directs the reset controller 412 to fetch the contents of the BIOS ROM, including the encrypted digital signature, and the contents are provided to the execution logic 406 via TBUS. Therein, the tamper detection microcode directs the crypto/hash unit 408 to perform a hash of the BIOS according to the hash algorithm that was used by the BIOS manufacturer to generate the digital signature. The tamper detection microcode also directs the crypto/hash unit 408 to decrypt the encrypted digital signature that was fetched from the BIOS ROM using the key stored in the key storage 410. The digital signature generated by the crypto/hash unit 408, along with the decrypted digital signature whose encrypted version is stored at the specific location in the BIOS ROM are provided to the tamper detector 414 via TBUS.

The tamper detector 414 compares the two digital signatures. If they are equal, then the tamper detector 414 returns control of the microprocessor to the point at which the timer interrupt occurred. If the two signatures are not equal, then the tamper detector 414 asserts signal SHUTDOWN. The SHUTDOWN signal directs remaining elements of the microprocessor to power down or otherwise enter a mode that precludes normal operation.

In another embodiment, rather than employing a fixed interval for the tamper timer 432, at completion of a periodic BIOS hack check the tamper detection microcode directs the random number generator 430 to generate a random number which is entered into the tamper timer 432 to set a following interval for a next BIOS hack check. In this manner, the times at which hack checks are performed cannot be predicted and anticipated.

Like the mechanism of FIG. 3, the periodic mechanism of FIG. 4 performs operations according to the present invention that only require decryption of an encrypted message digest that is stored in the specific location in the BIOS ROM, that is, decryption of, say, a 256-bit string as opposed to a 4 Megabyte string. In addition, the periodic mechanism protects a secure system from BIOS hacks during normal operation of the system.

Figure 5:
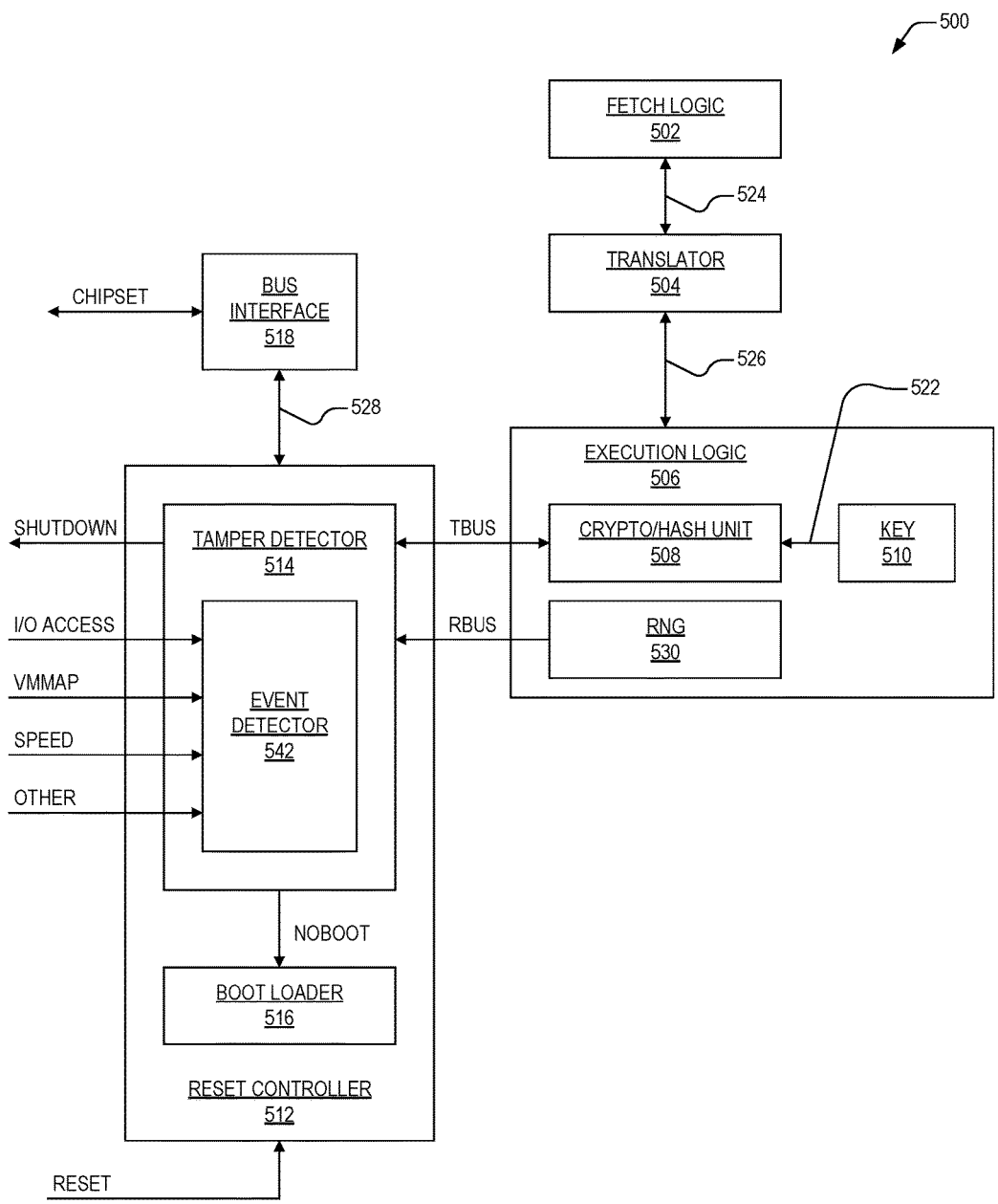
FIG. 5 is a block diagram illustrating an event-based mechanism according to the present invention for securing the BIOS of a computing system.

Turning to FIG. 5, a block diagram 500 is presented illustrating an event-based mechanism according to the present invention for securing the BIOS of a computing system. The mechanism of FIG. 4 is provided as an alternative embodiment for securing a system's BIOS upon when the computing system is operating normally, but one which is based upon the occurrence of events as opposed to the passing of time. Such events may include, but are not limited to, hard disk access (or other form of input/output access), changes to virtual memory mapping (for configurations in which the mechanism may be employed in a virtual processing system), changes to processor speed, and other types of events that typically occur in a present day computing system. Accordingly, the event-based mechanism is provided to accomplish this objective.

The diagram 500 illustrates elements of a microprocessor according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 502 that is coupled to a translator 504 via bus 524. The translator 504 is coupled to execution logic 506 via bus 526. The execution logic 506 includes a crypto/hash unit 508 that is coupled to key storage 510 via bus 522. The execution logic 506 also includes a random number generator 530. The microprocessor also includes a bus interface 518 through which the microprocessor interfaces to a chipset. The bus interface 518 is coupled to a reset controller 512 via bus 528. The reset controller 512 receives a reset signal RESET and generates a shutdown signal SHUTDOWN. The reset controller 512 includes a tamper detector 514 that is coupled to a boot loader 516 via bus NOBOOT. The tamper detector 514 includes an event detector 542 that receives an input/output access signal I/O ACCESS, a virtual memory map change signal VMMAP, a processor speed change signal SPEED, and an other event signal OTHER. The reset controller 512 is coupled to the execution logic 506 via a tamper bus TBUS and a random number bus RBUS.

In operation, elements of the mechanism of FIG. 5 function in a manner substantially similar to those like named elements of the mechanisms of FIGS. 3 and 4. However, in addition to detecting BIOS tampers during a reset boot sequence, the mechanism of FIG. 4 also includes tamper detection microcode and elements that examine the BIOS to determine if it has been tampered with while the computing system is operating. Validity checks of the BIOS are based upon the occurrence of events rather than based upon time. The present inventor notes that there are a number of events that regularly occur in a present day computing system that are executed by the microprocessor such as I/O accesses (to, say, the hard disk, or PCI Express), changes in core clock speed, operating system calls, changes in system state, and etc. Hence, the signals that are received by the event detector 542 are exemplary only and are not meant to restrict the types of events that may be utilized to trigger BIOS checks that that shown in the diagram 500.

Like the cryptographic key, the event detector 542 cannot be accessed via the execution of program instructions, but exclusively by the tamper detector 514 and tamper detection microcode. In one embodiment, the event detector 542 interrupts normal operation of the system when one of the above noted events occurs, as is indicated by assertion of one of the signals I/O ACCESS, VMMAP, SPEED, OTHER. In another embodiment, the event detector 542 interrupts normal operation of the system when a plurality of one of the above noted events occurs. A further embodiment contemplates interruption of normal operation when a plurality of the events occurs (such as an I/O access and a change in core clock speed). The selected events and the number of occurrences thereof is established by the tamper detection microcode. When interrupted, the controller 512 fetches all of the contents the BIOS ROM (not shown) via the bus interface 518, and provides the contents to the execution logic 506 via TBUS. The tamper detection microcode directs the reset controller 512 to fetch the contents of the BIOS ROM, including the encrypted digital signature, and the contents are provided to the execution logic 506 via TBUS. Therein, the tamper detection microcode directs the crypto/hash unit 508 to perform a hash of the BIOS according to the hash algorithm that was used by the BIOS manufacturer to generate the digital signature. The tamper detection microcode also directs the crypto/hash unit 508 to decrypt the encrypted digital signature that was fetched from the BIOS ROM using the key stored in the key storage 510. The digital signature generated by the crypto/hash unit 508, along with the decrypted digital signature whose encrypted version is stored at the specific location in the BIOS ROM are provided to the tamper detector 514 via TBUS.

The tamper detector 514 compares the two digital signatures. If they are equal, then the tamper detector 514 returns control of the microprocessor to the point at which the event-based interrupt occurred. If the two signatures are not equal, then the tamper detector 514 asserts signal SHUTDOWN. The SHUTDOWN signal directs remaining elements of the microprocessor to power down or otherwise enter a mode that precludes normal operation.

In another embodiment, rather than employing a fixed number of event occurrences for the event detector 542, at completion of a BIOS hack check the tamper detection microcode directs the random number generator 530 to generate a random number which is entered into the event detector 542 to establish a following number of events that must occur before a next BIOS hack check is performed. In this manner, the number of events that occur with trigger hack checks cannot be predicted and precluded via surreptitious applications executing on the microprocessor. In a further embodiment, the random number is employed to vary the type of event that triggers the next BIOS hack check.

Like the mechanisms of FIGS. 3 and 4, the event-based mechanism of FIG. 5 performs operations according to the present invention that only require decryption of an encrypted message digest that is stored in the specific location in the BIOS ROM, that is, decryption of, say, a 256-bit string (the encrypted message digest) as opposed to a 4 Megabyte string (e.g., the entire BIOS). In addition, the event-based mechanism protects a secure system from BIOS hacks during normal operation of the system, where the number and types of events that trigger hack checks cannot be determined and forced.

Figure 6:
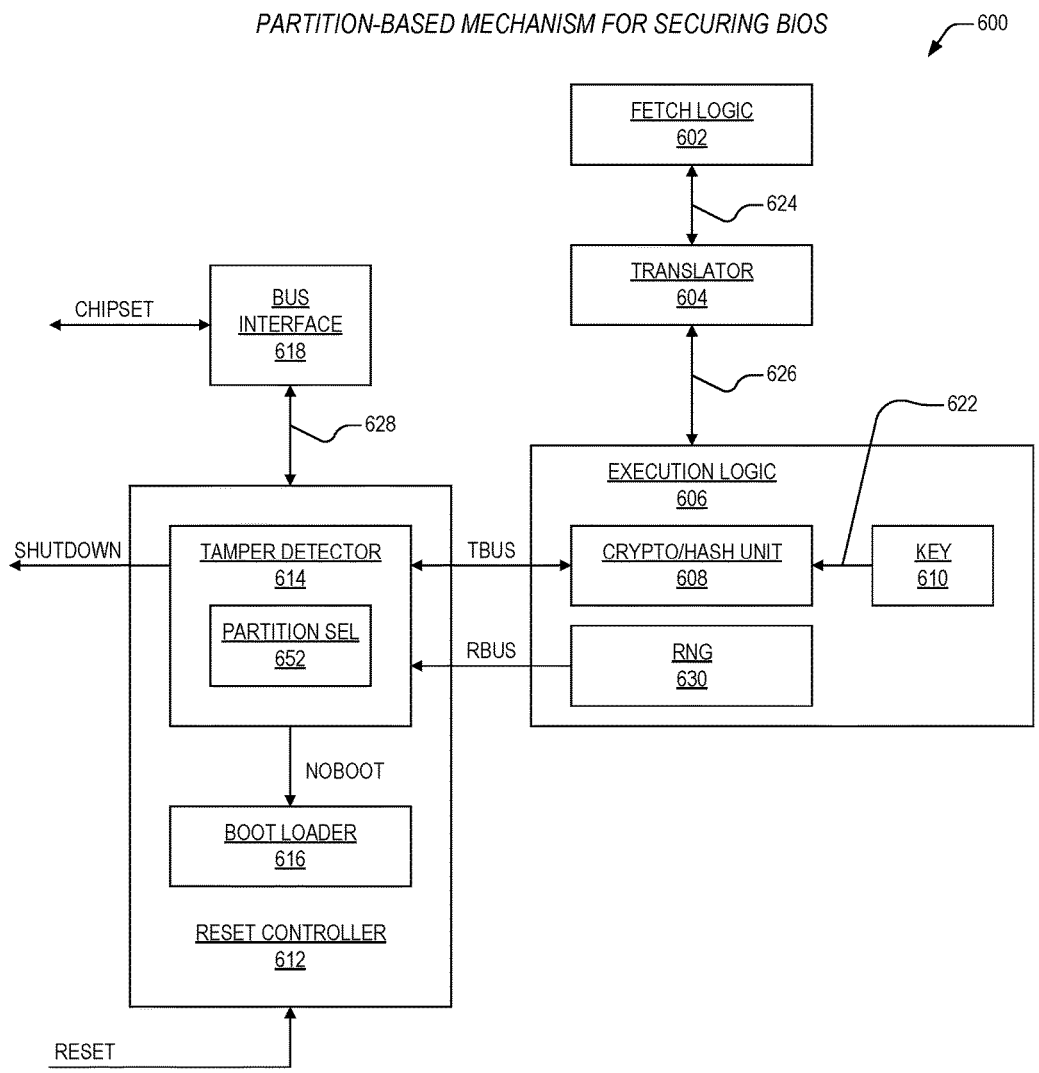
FIG. 6 is a block diagram detailing a partition-based mechanism according to the present invention for securing the BIOS of a computing system.

Referring now to FIG. 6, a block diagram 600 is presented detailing a partition-based mechanism according to the present invention for securing the BIOS of a computing system. The mechanism of FIG. 6 is provided as an another embodiment for securing a system's BIOS upon when the computing system is operating normally, but one which checks only a subset of the BIOS when triggered by either a tamper timer interrupt (as in the embodiment of FIG. 3) or a system event (as in the embodiment of FIG. 4). Accordingly, the partition-based mechanism is provided for use in configurations where performance is relatively critical and, since only a portion of the BIOS is checked at each trigger point, there is less on an impact on system performance.

In the embodiment of FIG. 6, the BIOS space is divided into a plurality of partitions, each of which have a corresponding message digest that is encrypted and stored in corresponding location in the BIOS ROM. In one embodiment, the partition size is the same for each of the plurality of partitions. In another embodiment, the plurality of partitions has different sizes. In one embodiment, only one of the plurality of partitions is checked responsive to a BIOS check trigger (e.g., timer interrupt of event occurrence). In another embodiment, more than one of the plurality of partitions is checked responsive to a BIOS check trigger. In another embodiment, the number of the plurality of partitions that are checked responsive to a BIOS check trigger is determined by the tamper detection microcode (e.g., a repeating cycle of, say, 1-3-1-2).

The diagram 600 illustrates elements of a microprocessor according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 602 that is coupled to a translator 604 via bus 624. The translator 604 is coupled to execution logic 606 via bus 626. The execution logic 606 includes a crypto/hash unit 608 that is coupled to key storage 610 via bus 622. The execution logic 606 also includes a random number generator 630. The microprocessor also includes a bus interface 618 through which the microprocessor interfaces to a chipset. The bus interface 618 is coupled to a reset controller 612 via bus 628. The reset controller 612 receives a reset signal RESET and generates a shutdown signal SHUTDOWN. The reset controller 612 includes a tamper detector 614 that is coupled to a boot loader 616 via bus NOBOOT. The tamper detector 614 includes a partition selector 652. The reset controller 612 is coupled to the execution logic 606 via a tamper bus TBUS and a random number bus RBUS.

In operation, elements of the mechanism of FIG. 6 function in a manner substantially similar to those like named elements of the mechanisms of FIGS. 3-5. However, in addition to detecting BIOS tampers during a reset boot sequence, the mechanism of FIG. 6 also includes tamper detection microcode and elements that examine the BIOS to determine if it has been tampered with while the computing system is operating. Validity checks of the BIOS are based upon the occurrence of triggers as described above. Upon the occurrence of a trigger, the partition selector 652 selects one or more of the plurality of partitions of the BIOS to be checked for validity.

Like the cryptographic key, the partition selector 652 cannot be accessed via the execution of program instructions, but exclusively by the tamper detector 614 and tamper detection microcode. When a trigger occurs, normal operation of the computing system is interrupted and the partition selector direct the controller 612 to fetch the contents of one or more of the plurality of partitions of the BIOS ROM (not shown) via the bus interface 618, which are provided to the execution logic 606 via TBUS. The contents, including one or more of the corresponding encrypted digital signatures, are provided to the execution logic 606 via TBUS. Therein, the tamper detection microcode directs the crypto/hash unit 608 to perform a hash of the one or more of the plurality of partitions according to the hash algorithm that was used by the BIOS manufacturer to generate the one or more digital signatures. The tamper detection microcode also directs the crypto/hash unit 608 to decrypt the one or more corresponding encrypted digital signatures that were fetched from the BIOS ROM using the key stored in the key storage 610. The one or more digital signatures generated by the crypto/hash unit 608, along with the one or more decrypted digital signatures whose encrypted versions are stored in one or more specific locations in the BIOS ROM are provided to the tamper detector 614 via TBUS.

The tamper detector 614 compares one or more pairs of the digital signatures. If all comparisons are equal, then the tamper detector 614 returns control of the microprocessor to the point at which the event-based interrupt occurred. If the signatures are not equal, then the tamper detector 614 asserts signal SHUTDOWN. The SHUTDOWN signal directs remaining elements of the microprocessor to power down or otherwise enter a mode that precludes normal operation.

In another embodiment, rather than checking a fixed or cyclic number of the plurality of partitions, at completion of a BIOS hack check the tamper detection microcode directs the random number generator 630 to generate a random number which is entered into the partition selector 652 to establish a following number of partitions that are to be checked during a next BIOS hack check. In this manner, the number of partitions that are validated at check point triggers cannot be predicted and precluded via surreptitious applications executing on the microprocessor. In a different embodiment, the random number is employed to indicate a next one of the plurality of partitions to be checked.

Figure 7:
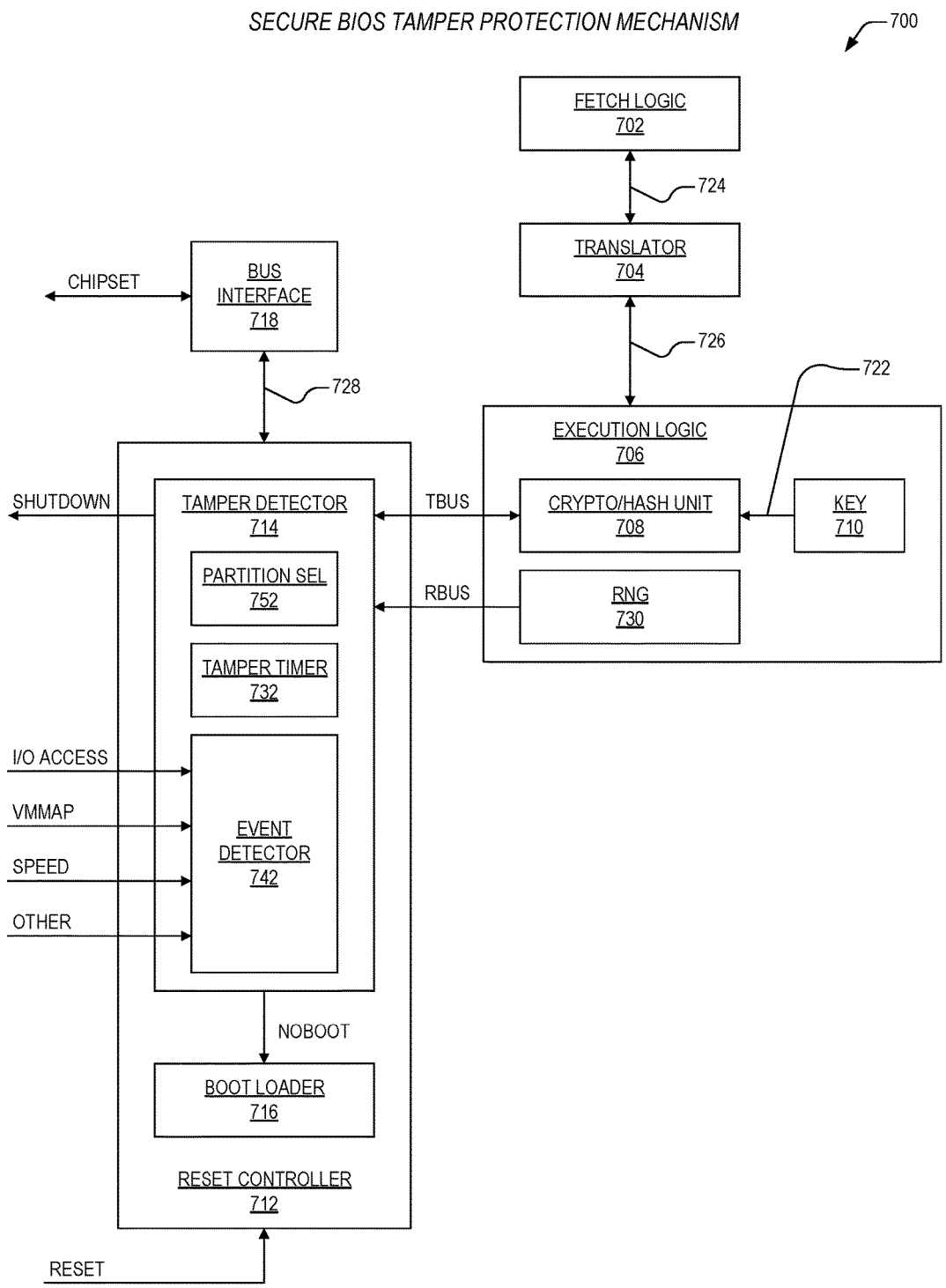
FIG. 7 is a block diagram showing a secure BIOS tamper protection mechanism according to the present invention.

Now referring to FIG. 7, a block diagram 700 is presented showing a secure BIOS tamper protection mechanism according to the present invention. The embodiment of FIG. 7 is provided as a comprehensive configuration that not only performs a full check of a computing system's BIOS upon power up and reset, but that also provides for a full protection of the system's BIOS during operation in a manner that combines the use of the techniques described above with reference to FIGS. 4-6.

The diagram 700 illustrates elements of a microprocessor according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 702 that is coupled to a translator 704 via bus 724. The translator 704 is coupled to execution logic 706 via bus 726. The execution logic 706 includes a crypto/hash unit 708 that is coupled to key storage 710 via bus 722. The execution logic 706 also includes a random number generator 730. The microprocessor also includes a bus interface 718 through which the microprocessor interfaces to a chipset. The bus interface 718 is coupled to a reset controller 712 via bus 728. The reset controller 712 receives a reset signal RESET and generates a shutdown signal SHUTDOWN. The reset controller 712 includes a tamper detector 714 that is coupled to a boot loader 716 via bus NOBOOT. The tamper detector 614 includes a tamper timer 732, an event detector 742, and a partition selector 752. The event detector 742 receives an input/output access signal I/O ACCESS, a virtual memory map change signal VMMAP, a processor speed change signal SPEED, and an other event signal OTHER. The reset controller 712 is coupled to the execution logic 706 via a tamper bus TBUS and a random number bus RBUS.

In operation, elements of the mechanism of FIG. 7 function in a manner substantially similar to those like named elements of the mechanisms of FIGS. 3-6. However, in addition to detecting BIOS tampers during a reset boot sequence, the mechanism of FIG. 7 also includes tamper detection microcode and elements that examine the BIOS to determine if it has been tampered with while the computing system is operating. Validity checks of the BIOS are based upon the occurrence of a timer interrupt from the tamper timer 732 and event triggers as described with reference to FIG. 5 above. Upon the occurrence of a timer interrupt or event trigger, the partition selector 752 selects one or more of the plurality of partitions of the BIOS to be checked for validity as is discussed above with reference to FIG. 6.

The tamper timer 732, the event detector 742, and the partition selector 752 cannot be accessed via the execution of program instructions, but exclusively by the tamper detector 714 and tamper detection microcode. When a timer interrupt or event trigger occurs, normal operation of the computing system is interrupted and the partition selector direct the controller 712 to fetch the contents of one or more of the plurality of partitions of the BIOS ROM (not shown) via the bus interface 718, which are provided to the execution logic 706 via TBUS. The contents, including one or more of the corresponding encrypted digital signatures, are provided to the execution logic 706 via TBUS. Therein, the tamper detection microcode directs the crypto/hash unit 708 to perform a hash of the one or more of the plurality of partitions according to the hash algorithm that was used by the BIOS manufacturer to generate the one or more digital signatures. The tamper detection microcode also directs the crypto/hash unit 708 to decrypt the one or more corresponding encrypted digital signatures that were fetched from the BIOS ROM using the key stored in the key storage 710. The one or more digital signatures generated by the crypto/hash unit 708, along with the one or more decrypted digital signatures whose encrypted versions are stored in one or more specific locations in the BIOS ROM are provided to the tamper detector 714 via TBUS.

The tamper detector 714 compares one or more pairs of the digital signatures. If all comparisons are equal, then the tamper detector 714 returns control of the microprocessor to the point at which the event-based interrupt occurred. If the signatures are not equal, then the tamper detector 714 asserts signal SHUTDOWN. The SHUTDOWN signal directs remaining elements of the microprocessor to power down or otherwise enter a mode that precludes normal operation.

One embodiment contemplates a combined sequence of timer interrupts and event triggers that is determined by the tamper detection microcode. Another embodiment employs a random number generated by the random number generator 730 at the end of a BIOS check to indicate if a next BIOS check will be initiated based on a timer interrupt or an event trigger. As is discussed above with reference to FIGS. 4-5, the random number generator 730 may be employed, in some embodiments, to randomly vary the time interval and/or event types and number of events.

In another embodiment, rather than checking a fixed or cyclic number of the plurality of partitions, at completion of a BIOS hack check the tamper detection microcode directs the random number generator 730 to generate a random number which is entered into the partition selector 752 to establish a following number of partitions that are to be checked during a next BIOS hack check. In this manner, the number of partitions that are validated at check point triggers cannot be predicted and precluded via surreptitious applications executing on the microprocessor. In a different embodiment, the random number is employed to indicate a next one of the plurality of partitions to be checked.

Figure 8:
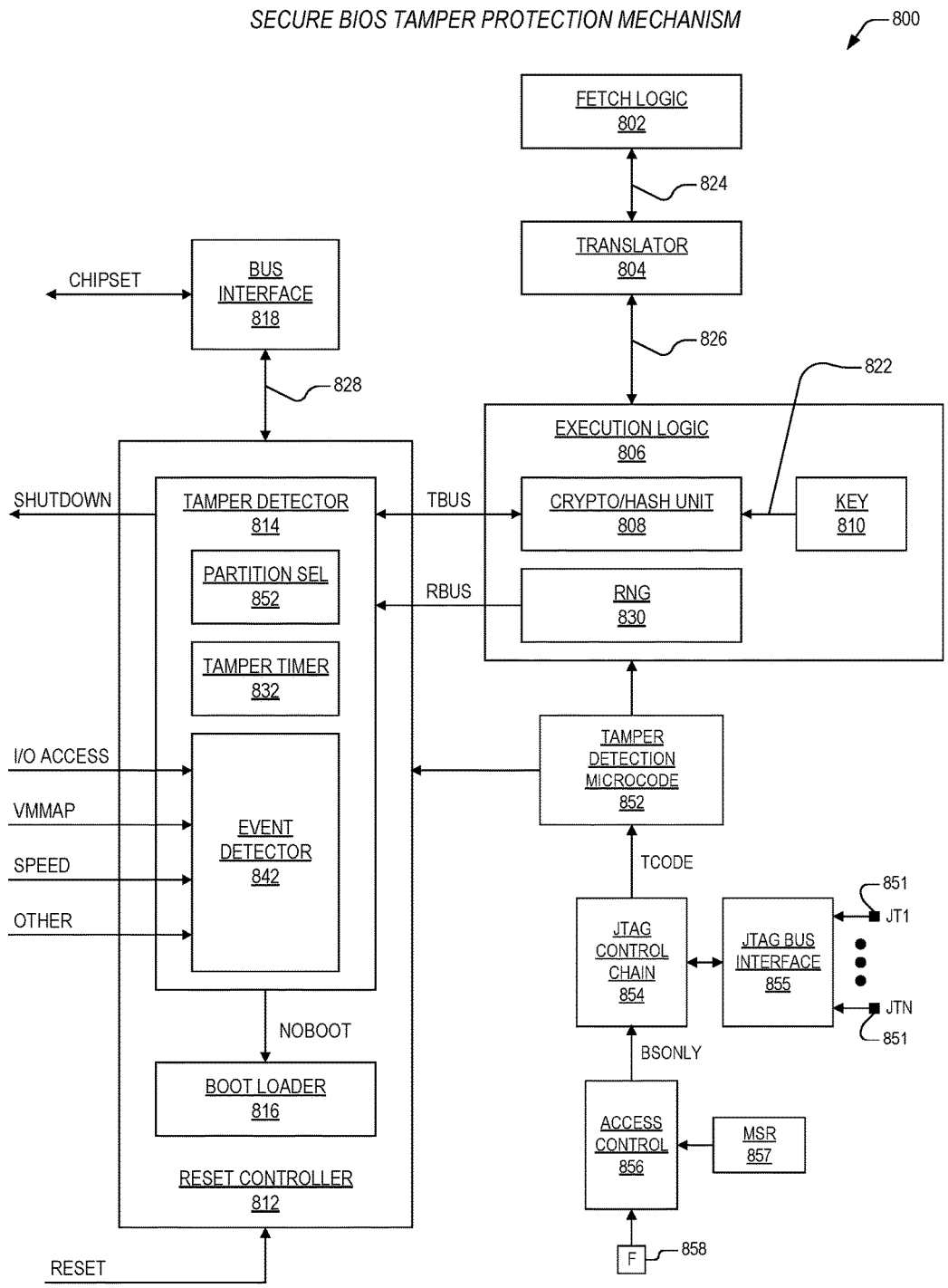
FIG. 8 is a block diagram showing a programmable secure BIOS tamper protection mechanism according to the present invention.

Now turning to FIG. 8, a block diagram is presented depicting a programmable secure BIOS tamper protection mechanism according to the present invention. Like the embodiment of FIG. 7, the embodiment of FIG. 8 is provided as a comprehensive configuration that not only performs a full check of a computing system's BIOS upon power up and reset, but that also provides for a full protection of the system's BIOS during operation in a manner that combines the use of the techniques described above with reference to FIGS. 4-6. Moreover, the embodiment of FIG. 8 includes provisions to program prescribed intervals, a plurality of event types, numbers and sequences of the plurality of event types which are employed to trigger a BIOS check of one or more BIOS partitions.

The diagram 800 illustrates elements of a microprocessor according to the present invention that is disposed on a single die and packaged for mounting on a motherboard, as described above. In one embodiment, the microprocessor is compatible with the x86 architecture and capable of executing all of the instructions within the x86 instruction set. Another embodiment contemplates a multi-core processor disposed on a single die. A further embodiment considers a virtual processing core, that is, the core is a representation of a physical processor to an operating system of a logical partition that uses shared processors. In order to teach the present invention, simplified and necessary elements of the microprocessor that are relevant will be described in the following paragraphs, recognizing that there are many other components (e.g., load/store logic, cache memory, scheduling logic, etc.) therein which are known to those skilled in the art.

The microprocessor includes fetch logic 802 that is coupled to a translator 804 via bus 824. The translator 804 is coupled to execution logic 806 via bus 826. The execution logic 806 includes a crypto/hash unit 808 that is coupled to key storage 810 via bus 822. The execution logic 806 also includes a random number generator 830. The microprocessor also includes a bus interface 818 through which the microprocessor interfaces to a chipset. The bus interface 818 is coupled to a reset controller 812 via bus 828. The reset controller 812 receives a reset signal RESET and generates a shutdown signal SHUTDOWN. The reset controller 812 includes a tamper detector 814 that is coupled to a boot loader 816 via bus NOBOOT. The tamper detector 614 includes a tamper timer 832, an event detector 842, and a partition selector 852. The event detector 842 receives an input/output access signal I/O ACCESS, a virtual memory map change signal VMMAP, a processor speed change signal SPEED, and an other event signal OTHER. The reset controller 812 is coupled to the execution logic 806 via a tamper bus TBUS and a random number bus RBUS.

The microprocessor also includes tamper detection microcode storage 852 that is coupled to the execution logic 806 and the reset controller 812. The microprocessor also has a JTAG control chain 854 that is coupled to the microcode storage 852 and to a JTAG bus interface element 855. The JTAG bus interface element 855 communicates with a JTAG controller (not shown) via a JTAG bus JT[1:N]. Each signal of the JTAG bus JT[1:N] is interfaced to a corresponding connection pin 851 on the microprocessor package. The microprocessor may also include an access control element 856 that is coupled to the JTAG control chain 854 via bus BSONLY. The access control element 856 may be also coupled to a fuse 858. The access control element 856 may additionally be coupled to a machine specific register 857.

The tamper detection microcode storage 852 may comprise temporal storage (e.g., random access memory, registers, and the like), non-temporal storage (e.g., read-only memory, fixed programmable logic, and the like), or a combination of both temporal and non-temporal storage. Microinstructions fetched from the microcode storage 852 are directed by known mechanisms to the execution logic 806 within the microprocessor to perform other well-known programmed sequences of operations. In addition, tamper detection microcode may be fetched from the microcode storage 852 to perform the operations noted above for executing interval-based and event-based BIOS tamper checks.

The JTAG bus JT[1:N] provides for boundary scan and test of the microprocessor, and the states of the JTAG bus JT[1:N] are manipulated by a test unit, a debugger, or like equipment external to the microprocessor. The JTAG bus interface 855 receives JTAG commands passed over the bus JT[1:N] and routes these signals through the JTAG control chain 854, which is coupled to virtually all testable elements within the microprocessor. In addition to JTAG scan and test features, the architecture of the microprocessor is extended to allow for programming of prescribed BIOS check intervals, a plurality of event types, and numbers and sequences of the plurality of event types, which are employed by the tamper protection microcode in the microcode storage 852 to trigger BIOS checks as are disclosed above. To accomplish these operations, associated JTAG commands are routed though the control chain 854 to the microcode storage 852 via bus TCODE in order to program the prescribed BIOS check intervals, a plurality of event types, and numbers and sequences of the plurality of event types.

The embodiment of FIG. 8 according to the present invention may also provide a mechanism that prevents an unauthorized user from performing any JTAG activity outside of normal boundary scan and test operations. In one embodiment, the microprocessor includes the fuse 858 which is blown to indicate that harmful or unauthorized JTAG activity is to be disabled going forward, including programming of the prescribed BIOS check intervals, a plurality of event types, and numbers and sequences of the plurality of event types. Upon processor power up or reset, the access control element 856 detects the state of the fuse 858. If the fuse 858 is not blown, then the access control element 856 directs the JTAG control chain 854 via BSONLY to allow all JTAG operations, including programming of the prescribed BIOS check intervals, a plurality of event types, and numbers and sequences of the plurality of event types. However, if the fuse 858 is blown, then the access control element 856 directs the JTAG control chain 854 via BSONLY to preclude all JTAG operations outside of normal boundary scan and test operations. Consequently, when the fuse 858 is blown, commands received by the microprocessor over the JTAG bus JT[1:N] to program the prescribed BIOS check intervals, a plurality of event types, and numbers and sequences of the plurality of event types are ignored or otherwise rendered inoperative, as are commands received that attempt to read the contents of the microcode storage 852.

However, should it be required to program the prescribed BIOS check intervals, a plurality of event types, and numbers and sequences of the plurality of event types, or to read microcode from the storage 852 after the fuse 858 has been blown, the present invention may also provide a technique whereby the tamper proof features can be temporarily overridden. Accordingly, the embodiment of FIG. 8 may also include a machine specific register 857 that is coupled to the access control element 856. To temporarily re-enable extended JTAG operations if the fuse 858 has been blown, it is required that a specific value be present in the register 857. In one embodiment, this specific value is a value known only to the manufacturer of the microprocessor, which is stored within the access control element 856. This value may be common to all microprocessors produced in a certain lot, or it may be a universally known value. In another embodiment, this specific value is a value known only to the manufacturer of the microprocessor, which is encrypted via a specified number of rounds according to a prescribed encryption algorithm that is performed by the crypto/hash unit 808, and where a value unique to the microprocessor is used as an encryption key to perform the specified number of rounds.

Accordingly, upon power-up/reset, the access control element determines if the fuse 858 has been blown. If the fuse 858 is blown, then the access control element 856 checks the value in the register 857. In one embodiment, if the value in the register 857 matches an override value within the access control element 856, then the access control element 856 directs the JTAG control chain 854 to enable the above-noted JTAG operations. At regular intervals, the register 857 is checked to determine if the originally detected override value is still resident therein. If so, then JTAG extended operations are allowed. However, when the value is no longer detected within the register 857, then the extended JTAG operations are precluded.

In another embodiment, the access control element 856 determines if the fuse 858 has been blown. If the fuse 858 is blown, then the access control element 856 checks the value in the register 857 and employs the crypto/hash unit 808 in parallel to perform the specified number of rounds using the value unique to the processor as the key. If the value in the register 857 matches the encrypted value, then the access control element 856 directs the JTAG control chain 854 to enable the above-noted JTAG operations. At regular intervals, the register 857 is checked to determine if the originally detected override value is still resident therein. If so, then JTAG extended operations are allowed. However, when the value is no longer detected within the register 857, then the extended JTAG operations are precluded.

In operation, elements of the mechanism of FIG. 8 function in a manner substantially similar to those like named elements of the mechanisms of FIGS. 3-7, using the prescribed BIOS check intervals, a plurality of event types, and numbers and sequences of the plurality of event types, as programmed via the JTAG bus interface 855, or by employing previously programmed prescribed BIOS check intervals, a previously programmed plurality of event types, and previously programmed numbers and sequences of the previously programmed plurality of event types when the fuse 858 is blown. One embodiment of the present invention contemplates additionally establishing previously programmed prescribed BIOS check intervals, previously programmed plurality of event types, and previously programmed numbers and sequences of the previously programmed plurality of event types when the fuse 858 is blown and the value is present within the machine specific register 857, thus allowing intervals, event types, and numbers and sequences of the event types to be changed after the fuse 858 has been blown.

However, in addition to detecting BIOS tampers during a reset boot sequence, the mechanism of FIG. 8 also includes tamper detection microcode and elements that examine the BIOS to determine if it has been tampered with while the computing system is operating. Validity checks of the BIOS are based upon the occurrence of a timer interrupt from the tamper timer 832 and event triggers as described with reference to FIGS. 5 and 7 above. Upon the occurrence of a timer interrupt or event trigger, the partition selector 852 selects one or more of the plurality of partitions of the BIOS to be checked for validity as is discussed above with reference to FIG. 6.

The tamper timer 832, the event detector 842, and the partition selector 852 cannot be accessed via the execution of program instructions, but exclusively by the tamper detector 814 and tamper detection microcode. When a timer interrupt or event trigger occurs, normal operation of the computing system is interrupted and the partition selector direct the controller 812 to fetch the contents of one or more of the plurality of partitions of the BIOS ROM (not shown) via the bus interface 818, which are provided to the execution logic 806 via TBUS. The contents, including one or more of the corresponding encrypted digital signatures, are provided to the execution logic 806 via TBUS. Therein, the tamper detection microcode directs the crypto/hash unit 808 to perform a hash of the one or more of the plurality of partitions according to the hash algorithm that was used by the BIOS manufacturer to generate the one or more digital signatures. The tamper detection microcode also directs the crypto/hash unit 808 to decrypt the one or more corresponding encrypted digital signatures that were fetched from the BIOS ROM using the key stored in the key storage 810. The one or more digital signatures generated by the crypto/hash unit 808, along with the one or more decrypted digital signatures whose encrypted versions are stored in one or more specific locations in the BIOS ROM are provided to the tamper detector 814 via TBUS.

The tamper detector 814 compares one or more pairs of the digital signatures. If all comparisons are equal, then the tamper detector 814 returns control of the microprocessor to the point at which the event-based interrupt occurred. If the signatures are not equal, then the tamper detector 814 asserts signal SHUTDOWN. The SHUTDOWN signal directs remaining elements of the microprocessor to power down or otherwise enter a mode that precludes normal operation.

One embodiment contemplates a combined sequence of timer interrupts and event triggers that is determined by the tamper detection microcode. Another embodiment employs a random number generated by the random number generator 830 at the end of a BIOS check to indicate if a next BIOS check will be initiated based on a timer interrupt or an event trigger. As is discussed above with reference to FIGS. 4-5, the random number generator 830 may be employed, in some embodiments, to randomly vary the time interval and/or event types and number of events.

In another embodiment, rather than checking a fixed or cyclic number of the plurality of partitions, at completion of a BIOS hack check the tamper detection microcode directs the random number generator 830 to generate a random number which is entered into the partition selector 852 to establish a following number of partitions that are to be checked during a next BIOS hack check. In this manner, the number of partitions that are validated at check point triggers cannot be predicted and precluded via surreptitious applications executing on the microprocessor. In a different embodiment, the random number is employed to indicate a next one of the plurality of partitions to be checked.

The elements of the microprocessors according to the present invention are configured to perform the functions and operations as discussed above. The elements comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the microprocessor may be shared with other circuits, microcode, etc., that are employed to perform other functions and/or operations within the microprocessor. According to the scope of the present application, microcode is a term employed to refer to one or more micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing"

or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software (e.g., microcode, firmware, program instructions, etc.) implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory (CDROM)), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for protecting a basic input/output system (BIOS) in a computing system, the apparatus comprising:
   a BIOS read only memory (ROM), comprising:
      BIOS contents, wherein said BIOS contents are stored as plaintext; and
      an encrypted message digest, wherein said encrypted message digest comprises an encrypted version of a first message digest that corresponds to said BIOS contents;
   a tamper detector, operatively coupled to said BIOS ROM, configured to generate a BIOS check interrupt at a combination of prescribed intervals and event occurrences, and configured to access said BIOS contents and said encrypted message digest upon assertion of said BIOS check interrupt, and configured to direct a microprocessor to generate a second message digest corresponding to said BIOS contents and a decrypted message digest corresponding to said encrypted message digest, and configured to compare said second message digest with said decrypted message digest, and configured to preclude said operation of said microprocessor if said second message digest and said decrypted message digest are not equal;
   a random number generator disposed within said microprocessor, wherein said random number generator generates a random number at completion of a current BIOS check, which is employed to set a following prescribed interval, whereby said prescribed intervals are randomly varied; and
   a JTAG control chain, configured to program said combination of prescribed intervals and event occurrences within tamper detection microcode storage.

2. The apparatus as recited in claim 1, wherein said BIOS ROM is disposed separately from said tamper timer and said tamper detector on a system board of the computing system.

3. The apparatus as recited in claim 1, wherein said microprocessor employs the Secure Hash Algorithm to generate said second message digest.

4. The apparatus as recited in claim 1, wherein said microprocessor employs the Advanced Encryption Standard algorithm to generate said decrypted message digest.

5. The apparatus as recited in claim 1, wherein said microprocessor comprises a dedicated crypto/hash unit disposed within execution logic, and wherein said crypto/hash unit generates said second message digest and said decrypted message digest, and wherein said key is exclusively accessed by said crypto/hash unit.

6. The apparatus as recited in claim 1, wherein said random number generator is disposed within execution logic in said microprocessor.

7. The apparatus as recited in claim 5, wherein said key and said tamper timer cannot be accessed by program instructions that are executed by said microprocessor.

8. An apparatus for protecting a basic input/output system (BIOS) in a computing system, the apparatus comprising:
   a BIOS read only memory (ROM), comprising:
      BIOS contents, wherein said BIOS contents are stored as plaintext; and
      an encrypted message digest, wherein said encrypted message digest comprises an encrypted version of a first message digest that corresponds to said BIOS contents; and
   a microprocessor, coupled to said BIOS ROM, said microprocessor comprising:
      a tamper detector, operatively coupled to said BIOS ROM, configured to generate a BIOS check interrupt at a combination of prescribed intervals and event occurrences, and configured to access said BIOS contents and said encrypted message digest upon assertion of said BIOS check interrupt, and configured to direct said microprocessor to generate a second message digest corresponding to said BIOS contents and a decrypted message digest corresponding to said encrypted message digest, and configured to compare said second message digest with said decrypted message digest, and configured to preclude said operation of said microprocessor if said second message digest and said decrypted message digest are not equal;
      a random number generator disposed within said microprocessor, wherein said random number generator generates a random number at completion of a current BIOS check, which is employed to set a following prescribed interval, whereby said prescribed intervals are randomly varied; and
      a JTAG control chain, configured to program said combination of prescribed intervals and event occurrences within tamper detection microcode storage.

9. The apparatus as recited in claim 8, wherein said BIOS ROM is disposed separately from said tamper timer and said tamper detector on a system board of the computing system.

10. The apparatus as recited in claim 8, wherein said microprocessor employs the Secure Hash Algorithm to generate said second message digest.

11. The apparatus as recited in claim 8, wherein said microprocessor employs the Advanced Encryption Standard algorithm to generate said decrypted message digest.

12. The apparatus as recited in claim 8, said microprocessor further comprising:

a dedicated crypto/hash unit disposed within execution logic, wherein said crypto/hash unit generates said second message digest and said decrypted message digest, and wherein said key is exclusively accessed by said crypto/hash unit.

13. The apparatus as recited in claim 8, wherein said random number generator is disposed within execution logic in said microprocessor.

14. The apparatus as recited in claim 12, wherein said key cannot be accessed by program instructions that are executed by said microprocessor.

15. A method for protecting a basic input/output system (BIOS) in a computing system, the method comprising:
    storing BIOS contents as plaintext in a BIOS ROM along with an encrypted message digest that comprises an encrypted version of first message digest that corresponds to the BIOS contents;
    programming a combination of prescribed intervals and event occurrences in tamper detection microcode storage;
    generating a BIOS check interrupt that interrupts normal operation of the computing system at the combination of prescribed intervals and event occurrences;
    upon assertion of the BIOS check interrupt, accessing the BIOS contents and the encrypted message digest, and generating a second message digest corresponding to the BIOS contents and a decrypted message digest corresponding to the first encrypted message digest using the same algorithms and key that were employed to generate the first message digest and the encrypted message digest;
    comparing the second message digest with the decrypted message digest;
    precluding operation of the microprocessor if the second message digest and the decrypted message digest are not equal; and
    employing a random number generator within the microprocessor to generate a random number at completion of a current BIOS check, which is employed to set a following prescribed interval, whereby the prescribed intervals are randomly varied.

16. The method as recited in claim 15, further comprising:
    separately disposing the BIOS ROM on a system board of the computing system.

17. The method as recited in claim 15, wherein said accessing comprises:
    employing the Secure Hash Algorithm to generate the second message digest.

18. The apparatus as recited in claim 15, wherein said accessing further comprises:
    employing the Advanced Encryption Standard algorithm to generate the decrypted message digest.

19. The method as recited in claim 15, wherein the microprocessor comprises a dedicated crypto/hash unit disposed within execution logic, and wherein the crypto/hash unit generates the second message digest and the decrypted message digest, and wherein the key is exclusively accessed by the crypto/hash unit.

20. The method as recited in claim 15, wherein the random number generator is disposed within execution logic in the microprocessor.

21. The method as recited in claim 19, wherein the key cannot be accessed by program instructions that are executed by the microprocessor.

* * * * *